United States Patent
Newton et al.

(10) Patent No.: US 10,598,363 B2
(45) Date of Patent: Mar. 24, 2020

(54) APPARATUS AND METHOD FOR PROVIDING DOWNLIGHTING AND WALL-WASHING LIGHTING EFFECTS

(71) Applicant: SIGNIFY HOLDING B.V., Eindhoven (NL)

(72) Inventors: Philip Steven Newton, Waalre (NL); Tim Dekker, Eindhoven (NL); Tatiana Aleksandrovna Lashina, Eindhoven (NL); Bartel Marinus Van De Sluis, Eindhoven (NL); Dzmitry Viktorovich Aliakseyeu, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 16/250,058

(22) Filed: Jan. 17, 2019

(65) Prior Publication Data

US 2019/0145615 A1 May 16, 2019

Related U.S. Application Data

(62) Division of application No. 15/039,644, filed as application No. PCT/IB2014/065911 on Nov. 10, 2014, now Pat. No. 10,215,391.

(60) Provisional application No. 61/908,820, filed on Nov. 26, 2013.

(51) Int. Cl.
*F21S 8/02* (2006.01)
*F21V 23/04* (2006.01)
(Continued)

(52) U.S. Cl.
CPC .......... *F21V 23/0442* (2013.01); *F21S 8/026* (2013.01); *F21S 8/04* (2013.01); *F21V 23/0435* (2013.01);
(Continued)

(58) Field of Classification Search
CPC ............ F21V 23/0442; F21V 23/0464; F21V 23/0435; F21S 8/026
See application file for complete search history.

(56) References Cited

U.S. PATENT DOCUMENTS 6,250,774 B1 6/2001 Begemann et al.
7,665,862 B2* 2/2010 Villard .................... F21V 14/02
362/249.02
(Continued)

FOREIGN PATENT DOCUMENTS

GB 2438636 A1 12/2007
JP 2010177139 A2 8/2010
(Continued)

*Primary Examiner* — Karabi Guharay
(74) *Attorney, Agent, or Firm* — Meenakshy Chakravorty

(57) ABSTRACT

Disclosed is a lighting fixture (200) with a separately controllable set of LED-based light sources (102) configurable to create both downlighting and wall-washing lighting effects. To create the desired wall-washing effects, the intensity and angle of light sources in the lighting fixture are adjusted to individually illuminate different portions of the wall of surface. One set of LED-based light sources positioned along the edge of the ceiling tile is configured to emit a low intensity light beam toward the upper portion of the wall surface adjacent the ceiling. Another set of LED-based light sources emits a higher intensity light beam toward an intermediate portion of the wall surface. Another set of LED-based light sources emits an even higher intensity light beam toward the bottom portion of the wall surface.

16 Claims, 6 Drawing Sheets

(51) Int. Cl.
*F21S 8/04* (2006.01)
*H05B 37/02* (2006.01)
*H05B 33/08* (2020.01)
*F21Y 115/10* (2016.01)

(52) U.S. Cl.
CPC ..... *F21V 23/0464* (2013.01); *H05B 33/0854* (2013.01); *H05B 37/0281* (2013.01); *F21Y 2115/10* (2016.08); *Y02B 20/42* (2013.01)

(56) References Cited

U.S. PATENT DOCUMENTS

| | | |
|---|---|---|
| 2007/0258233 A1* | 11/2007 | Gray ............... F21S 8/026 362/148 |
| 2010/0046225 A1 | 2/2010 | Zheng |
| 2010/0046227 A1 | 2/2010 | Knoble et al. |
| 2010/0110671 A1 | 5/2010 | Gordin et al. |
| 2010/0165616 A1 | 7/2010 | Wilkinson et al. |
| 2010/0296285 A1 | 11/2010 | Chemel et al. |
| 2010/0301769 A1 | 12/2010 | Chemel et al. |
| 2011/0175533 A1 | 7/2011 | Holman et al. |

FOREIGN PATENT DOCUMENTS

| | | |
|---|---|---|
| JP | 2010257742 A2 | 11/2010 |
| JP | 2012069357 A2 | 4/2012 |
| WO | WO2011020041 A1 | 2/2011 |
| WO | WO2011039690 A1 | 4/2011 |

* cited by examiner

APPARATUS AND METHOD FOR PROVIDING DOWNLIGHTING AND WALL-WASHING LIGHTING EFFECTS

TECHNICAL FIELD

The present invention is directed generally to indoor lighting. More particularly, the various inventive methods and apparatus disclosed herein relate to lighting fixtures providing wall-washing lighting effects through the use of lighting panels, e.g. ceiling-mounted tiles, equipped with LED-based lighting units.

BACKGROUND

Many people live and work in relatively compact spaces due to the population density that comes with urbanization and population growth. Fortunately, small and compact spaces can be made to appear more pleasant and spacious by the appropriate use of lighting technology. Well-illuminated walls and ceilings are perceived as being more pleasant, creating more spacious environments, and they are known to positively affect mood and subjective performance. Wall-washing lighting effects, in particular, are perceived as visually comforting such that a space that has brightly illuminated walls is more likely to obtain a high lighting quality appraisal than one that does not have wall-washing. Thus, the lighting quality of a space can play a key role in a person's overall satisfaction with that space.

The comfort and productivity in office environments can also be increased by introducing an appropriate balance between the office's ambient light and its functional light levels. For example, the functional light level on a work surface (e.g., a desk) can be decreased if the ambient light used for wall-washing or downlighting is set at a sufficient intensity level. In other words, when the ambient light levels are relatively high, the space is brighter, and people are less likely to use desk lamps or other such functional lighting elements.

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects.

Lighting panels, e.g. ceiling tiles, can be equipped with LED lighting elements for downlighting. While conventional ceiling tiles of this type can be used to illuminate some of the wall surface, most of the light distribution is typically aimed downwardly toward the (horizontal) floor surface such that the ceiling/wall interface is unevenly illuminated. However, when lighting is directly aimed at a wall surface, the lights often produce reflected hotspots and an annoying glare. If the owner of the space has the means, conventional (and upscale) wall-washing systems can be installed to create a more pleasant atmosphere. The light distribution is controlled by using separate luminaries that require advanced control infrastructures. As a result, conventional wall-washing systems are expensive to make, require additional space, and are also expensive to install. Accordingly, there are scant downlighting and wall-washing lighting systems currently available that provide the typical user with an effective downlighting and wall-washing solution at a reasonable budget.

Thus, there is a need in the art for an inexpensive and energy-efficient lighting solution that evenly illuminates the wall and the ceiling. There is also a need in the art for an inexpensive wall-washing solution that evenly and uniformly illuminates the entire surface of a vertical wall without glare or reflected hotspots.

SUMMARY

The present disclosure is directed to inventive methods and apparatuses for combined downlighting and wall-washing. For example, LED-based lighting units according to various embodiments of the present invention, which can be incorporated directly into a ceiling tile, provides an inexpensive overhead lighting solution that evenly and uniformly illuminates the entire surface of a wall or vertical surface without glare or reflected hotspots. Briefly stated, the invention yields these benefits by providing at least two separately controllable sets of LED-based lighting units that individually illuminate different portions of the wall to thus provide an overall uniform lighting distribution over the entire wall surface.

For example, in some embodiments, one set of LED elements is positioned along the edge of the ceiling tile and is configured to emit a low intensity light beam having a relatively wide beam width toward an upper portion of the wall surface adjacent the ceiling. A second set of LEDs emits a higher intensity light beam having a narrower beam width toward a bottom portion of the wall surface. In other embodiments, a second set of LEDs emitting a higher intensity light beam and having a narrower beam width toward an intermediate portion of the wall surface, and then a third set of LEDs emitting a relatively higher intensity light beam having a relatively narrow beam width toward the bottom portion of the wall surface. Additional sets of LEDs having optimal light intensity and beam angle and direction can also be provided to achieve uniform illumination of the wall surface.

Accordingly, when illuminated by separately controllable sets of LED-based lighting units taken together, the entire wall surface is bathed in a substantially uniform light that is pleasing and comforting to the eye. Finally, the ceiling tile lighting fixture is further equipped with a set of downwardly directed LEDs that are also individually controllable such that both the wall and ceiling are evenly illuminated.

Generally, in one aspect, the invention relates to a lighting fixture that is located in close proximity to a vertical surface and includes a plurality of lighting units, including at least one first lighting unit having a first plurality of LED-based light sources configured to emit a low-intensity light beam oriented toward a first portion of the vertical surface, at least one second lighting unit having a second plurality of LED-based light sources configured to emit a high-intensity light beam oriented toward a second portion of the vertical surface, at least one lighting unit having a third plurality of LED-based light sources configured to emit a light beam oriented toward a horizontal surface; and a controller connected to the lighting units to control the intensity of light emitted from the light sources.

In some embodiments, the lighting fixture further includes at least one fourth lighting unit having a third plurality of light sources configured to emit an intermediate-intensity light beam oriented toward a third portion of the vertical surface, wherein the first portion is an upper portion of the vertical surface, the second portion is a lower portion of the vertical surface, and the third portion is an intermediate portion of the vertical surface.

In some embodiments, the orientation of each of the light beams is adjustable.

In some embodiments, the lighting fixture further includes a sensor to obtain data about the vertical surface, where the controller controls the intensity or orientation of light emitted from the first, second, and/or third plurality of light sources based at least in part on the data obtained from the sensor.

In some embodiments, the number of third lighting units configured to emit a light beam oriented toward the horizontal surface, and the number of first and second lighting units configured to emit a light beam oriented toward the horizontal surface within the plurality of lighting units, is adjustable based on positioning of the lighting fixture relative to the vertical surface.

In some embodiments, a ratio of the number of third lighting units configured to emit a light beam oriented toward the horizontal surface and the number of first and second lighting units configured to emit a light beam oriented toward the horizontal surface comprise a first ratio, is adjustable based on positioning of the lighting fixture relative to the vertical surface.

Generally, in one aspect, the invention relates to a ceiling-mounted lighting fixture that includes a plurality of lighting units each comprising a plurality of LED-based light sources, where a first subset of the lighting units are configured to emit a light beam oriented toward a vertical surface, and a second subset of the lighting units are configured to emit a light beam oriented toward a horizontal surface, and where at least some of the lighting units are configured to be adjustable to emit a light beam oriented toward either the vertical surface or the horizontal surface. The lighting fixture also includes a controller connected to the lighting units to control the intensity of light emitted from LED-based light sources, to control the orientation of the light beam emitted by each of the adjustable lighting units.

In some embodiments, the orientation of the light beam emitted by each of the adjustable lighting units is based at least in part on positioning of the lighting fixture relative to the vertical surface.

In some embodiments, the lighting fixture also includes a sensor that obtains data about the vertical surface and the orientation of the light beam emitted by each of the adjustable lighting units is adjusted based at least in part on the obtained data.

Generally, in one aspect, the invention relates to a lighting fixture located in close proximity to a vertical surface and includes a plurality of lighting units each having a plurality of light sources emitting a light beam having an adjustable orientation, where a first subset of the lighting units emit a light beam oriented toward an upper portion of the vertical surface, a second subset of the lighting units emit a light beam oriented toward an intermediate portion of the vertical surface, a third subset of the lighting units emit a light beam oriented toward a lower portion of the vertical surface, and a fourth subset of the lighting units emit a light beam oriented toward a horizontal surface. The lighting fixture also includes a controller connected to the lighting units to control the intensity of light emitted from the light sources, and to control the orientation of each of the light sources.

In some embodiments, the orientation of the light beam emitted by one or more of the lighting units, and/or the number of lighting units within the first subset, second subset, third subset, and fourth subset, is based at least in part on positioning of the lighting fixture relative to the vertical surface.

Generally, in one aspect, the invention relates to a method for providing wall-washing lighting effects. The method includes the steps of providing a lighting fixture having a plurality of lighting units each having a plurality of LED-based light sources, where a first subset of the lighting units emit a light beam oriented toward a vertical surface, and a second subset of the lighting units emit a light beam oriented toward a horizontal surface, and where at least some of the lighting units are adjustable to emit a light beam oriented toward either the vertical surface or the horizontal surface, and a controller connected to the lighting units to control the orientation of the light beam emitted by each of the adjustable lighting units based at least in part on a position of the lighting fixture relative to the vertical surface. The method also includes the steps of receiving information indicating the position of the lighting fixture relative to the vertical surface, and adjusting the orientation of the light beam emitted by one or more of the adjustable lighting units based on the received information.

In some embodiments, the method also includes the step of adjusting the intensity of the light beam emitted by one or more of the adjustable lighting units based on the received information.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
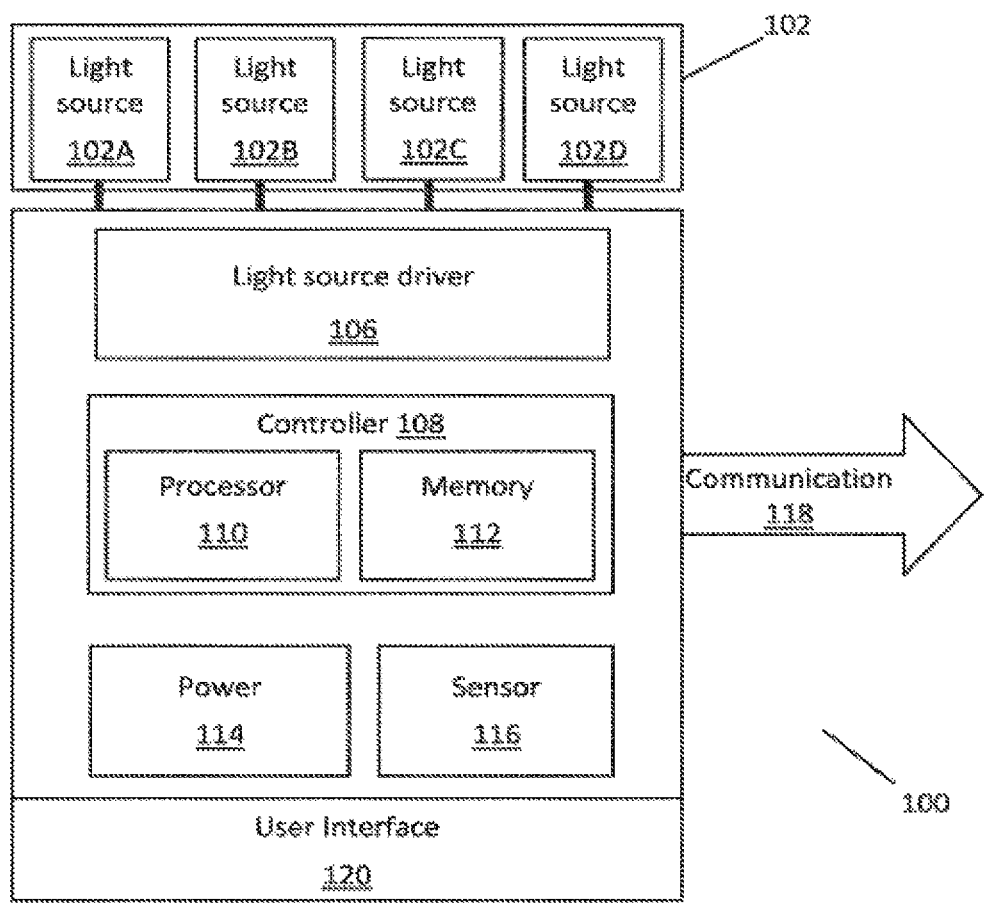
FIG. 1 is a schematic representation of a lighting unit in accordance with an embodiment of the invention.

In lighting systems, it is desirable to have an appropriate balance between the functional light level and the ambient light level. For example, it may be desirable to have well-illuminated walls and ceilings, which are perceived as being more pleasant, more spacious, and are known to positively affect mood, well-being, and performance. For example, wall-washing lighting effects are particularly perceived as visually comforting, with a space possessing brightly illuminated walls being more likely to obtain a high lighting quality appraisal than one that does not have wall-washing. It may be desirable, therefore, to install and utilize a lighting system with wall-washing lighting effects in addition to traditional or functional lighting effects.

Some lighting systems produce wall-washing lighting effects, but typically require separate lighting fixtures for both downlighting effects and wall-washing lighting effects. Such lighting systems present one or more drawbacks such as higher costs of manufacture and higher installation costs. Additional drawbacks of such lighting systems may be presented. For example, by requiring separate lighting fixtures for both downlighting effects and wall-washing lighting effects, these lighting systems take up additional space.

Thus, Applicants have recognized and appreciated a need in the art to provide methods and apparatus that provide a single lighting fixture for both downlighting and/or ambient illumination and wall-washing lighting effects, thus reducing manufacturing and installation costs, as well as reducing the amount of space required to install the lighting system, and that optionally overcome one or more drawbacks of existing apparatus and/or methods.

In view of the foregoing, various embodiments and implementations of the present invention are directed to a ceiling-mounted lighting tile or panel fixture with LED-based lighting units adapted to provide both wall-washing and downlighting effects.

In the following detailed description representative embodiments disclosing specific details are set forth to provide a thorough understanding of the claimed invention. However, it will be apparent to one of ordinary skill in the art having had the benefit of the present disclosure that other embodiments according to the present teachings that depart from the specific details disclosed herein are within the scope of the appended claims. Moreover, descriptions of well-known apparatus and methods may be omitted but are clearly within the scope of the claimed invention. As an example, aspects of the methods and apparatus disclosed herein are described with a lighting system having only LED-based light sources. However, one or more aspects of the methods and apparatus described herein may be implemented in other lighting systems that additionally and/or alternatively include other non-LED light sources. Implementation of the one or more aspects described herein in alternatively configured environments is contemplated without deviating from the scope or spirit of the claimed invention.

Referring to FIG. 1, according to one embodiment is a lighting unit 100 suitable for use in the lighting systems described herein. In various embodiments, the lighting unit 100 shown in FIG. 1 may be utilized alone or together with other similar lighting units in a system of lighting units, including as discussed further below in connection with FIG. 2.

The lighting unit 100 includes one or more light sources 102A, 102B, 102C, and 102D (collectively light source 102), where one or more of the light sources may be an LED-based light source that includes one or more LEDs. Any of the light sources may be adapted to generate radiation of different colors (e.g. red, green, blue). Although FIG. 1 illustrates a lighting unit with four LED-based light sources 102A, 102B, 102C, and 102D (collectively light source 102), many different numbers and various types of light sources (all LED-based and non-LED-based light sources alone or in combination, etc.) adapted to generate radiation of a variety of different colors may be employed in the lighting unit 100.

In some embodiments of the lighting unit 100, one or more of the light sources 102A, 102B, 102C, and 102D shown in FIG. 1 may include a group of multiple LEDs or other types of light sources that are controlled together. Additionally, it should be appreciated that one or more of the light sources may include one or more LEDs that are adapted to generate radiation having any of a variety of wavelengths, including, but not limited to various visible colors, various color temperatures of white light, ultraviolet, or infrared. LEDs having a variety of spectral bandwidths may be employed in various embodiments of the lighting unit.

The lighting unit 100 also includes a source of power 114, most typically AC power, although other power sources are possible including DC power sources, solar-based power sources, or mechanical-based power sources, among others. The power source may be in operable communication with a power source converter that converts power received from an external power source to a form that is usable by the lighting unit.

The lighting unit 100 may also include a controller 108 that is configured or programmed to output one or more signals to drive the light sources and generate varying intensities of light from the light sources. For example, controller 108 may be programmed or configured to generate a control signal for each light source to independently control the intensity of light generated by each light source, to control groups of light sources, or to control all light sources together. According to another aspect, the controller 108 may control other dedicated circuitry, such as light source driver 106, which in turn controls the light sources so as to vary their intensities. The controller 108 can be, for example, a microprocessor 110 programmed using software to perform various functions discussed herein, and can be utilized in combination with a memory 112. The memory can store data, including one or more lighting commands or software programs for execution by the microprocessor 110, as well as various types of data including but not limited to specific identifiers for that lighting unit.

In some embodiments, the controller 108 is coupled to and provides commands to the light source driver 106, and the light source driver 106 powers the light sources 102 based on these received commands. As one example, the controller 108 can provide control commands to the light source driver 106 to power one or more of the light sources 102 at 25% light output, and the light source driver 106 can then adjust the power provided to the light sources 102 in order to achieve 25% light output. The controller 108 and light source driver 106 may be separate but coupled components, or may be a combined component. For example, controller 108 may be included in light source driver 106.

In some embodiments, the controller 108 may provide lighting control commands to light source driver 106 based on the time of day, user input, or other preprogrammed options or timing. For example, in some embodiments a scene selection may be automatically or manually received (e.g., from a user via a user interface, or from a time) requesting lighting unit 100 to provide a particular light output in accordance with the desired scene. For example, the user may desire a "daytime" scene, and the controller 108 will providing lighting control commands to direct light source driver 106 to power the light sources 102 at a "daytime" level (e.g., a full output level). As another example, a timer or clock module may send input that triggers lighting unit 100 to provide a "nighttime" scene. Upon receiving the input, the controller 108 will providing lighting control commands to direct light source driver 106 to power the light sources 102 at a "nighttime" level (e.g., 50% output level).

The lighting unit 100 can also include a sensor 116 adapted to detect a wall within a certain proximity and direction. Accordingly, sensor 116 can be a variety of different types of sensors, including optical sensors and ambient light sensors. The lighting unit 100 is coupled to sensor 116 via a local connection and receives sensor values from the sensor 116. In some embodiments the sensor 116 may be mounted on the lighting unit 100 or integrated with the lighting unit 100. In some embodiments. the connection between the sensor 116 and the lighting unit 100 is a wired connection. In some embodiments, the connection between the sensor 116 and the lighting unit 100 is a wireless connection. In some embodiments the sensor 116 is positioned so as to provide sensor values that are relevant to the area illuminated by lighting unit 100.

In some embodiments, the controller 108 may provide lighting control commands based on input or data received from one or more sensors 116. For example, in some embodiments, the lighting unit 100 may be coupled to an occupancy sensor and may provide lighting control commands to light source driver 106 in response to the detection, or absence of detection, of occupants in the room. In some embodiments, the lighting unit 100 may be coupled to an ambient light level sensor to detect the levels of ambient light in the room, in which case the lighting unit 100 may provide lighting control commands to light source driver 106 requesting light sources 102 to operate at a certain level based on the sensed light levels. In some embodiments, the controller 108 may provide lighting control commands based on data from a timer or clock module.

In some embodiments, the lighting unit 100 includes one or more user interfaces 120 which allow a user to control a variety of lighting characteristics, including ON/OFF, color, intensity, angle, setting particular identifiers for the lighting unit, and many other characteristics. Communication between the user interface and the lighting unit may be accomplished through wired or wireless transmission. Manual control may be effected by the user via switch/control inputs disposed on the lighting unit itself. For example, user interface 120 can be a power switch (e.g., a standard wall switch) that interrupts power to the controller 108. Lighting unit 100 may be configured to include simple dipswitches, electronic switch buttons, or touch inputs. Dipswitches and electronic switch buttons can provide ON/OFF capabilities, or can also be configured to allow the user to adjust the intensity of the light provided by a single light source, a group of light sources, or all light sources. Alternatively, a user-operated commissioning device with user interaction means (e.g. a smartphone, tablet, or other portable or remote computing device) may be used to commission the lighting unit. For example, NFC (Near-Field Communication) is employed in one embodiment of the invention to establish a communications channel between the lighting unit and the remote computing device.

Although the user input may directly control one or more of the light sources, including by immediate control over power to one or more components of lighting unit 100, controller 105 may be configured or programmed to respond to the user input by activating a preprogrammed response, including executing a stored software program or utilizing the user input together with one or more other data inputs to choose which response to engage. In some embodiments, the controller 108 may be programmed or configured to monitor user interface 120 and respond to user input by, for example, selecting one or more pre-programmed control signals stored in memory, selecting and executing a new lighting program from memory, or otherwise affecting the radiation generated by one or more of the light sources 102.

In some embodiments, lighting unit 100 can utilize user input from user interface 120 in conjunction with data received from one or more sensors 116 to provide lighting control commands to light source driver 106, to select and execute a new lighting program from memory, or otherwise affecting the radiation generated by one or more of the light sources 102. For example, lighting unit 100 may be configured to monitor user interface 120 for user input, and to monitor sensor 116 for sensor data. Controller 108 of lighting unit 100 can utilize the user input in combination with the sensor data to control one or more of the light sources 102A, 102B, 102C and 102D in a manner similar to that discussed above.

In some embodiments, in order to communicate with neighboring lighting units, one or more of the lighting units 100 can include a communication port 118. The communication port 118 and communication medium can be any of a variety of wired or wireless formats, including a wired data bus, wireless RF communication, or light enabled communication such as coded visible or IR light, among other methods. Communication between adjacent lighting units allows for cooperative applications that are discussed in greater detail below. For example, communication port 118 may allow for the coupling of multiple lighting units together to form a networked lighting system. Further applications are possible in which one or more of the coupled lighting units are addressable. According to this embodiment, controller 105 may be configured or programmed to respond to data that is specifically addressed to that particular lighting unit 100.

For both functional and aesthetic reasons, the lighting unit 100 may be completely or partially housed within or integrated into an enclosure or housing. The housing or enclosure may include one or a multitude of lighting units. Further, a single lighting unit may be housed within two or more housings or enclosures, with some components of lighting unit 100 packaged within a first housing and other components housed within a second housing, with electrical and/or mechanical connections between the various components (including for example, the light sources, light source driver, controller, memory, power source, user interface, and sensor). The housing or enclosure may also include a heat management system, such as a fan, heat sink, or other method to keep the lighting units cool and prolong their life expectancy.

The lighting unit 100 may include one or more optical elements to optically process the radiation generated by the light sources 102A, 102B, 102C, and 102D. In some embodiments, the one or more optical elements may modify the spatial distribution or propagation direction of the generated radiation. Examples of optical elements include, but are not limited to, reflective materials, refractive materials, translucent materials, filters, lenses, mirrors, and fiber optics. The one or more optical elements may be completely or partially housed within or integrated into an enclosure or housing.

In some embodiments, the lighting unit 100 includes a positional motor to orient lighting unit 100 or one or more of light sources 102A, 102B, 102C, and 102D in a particular direction. The lighting unit 100 may also utilize sensor data from sensor 116 in order to properly orient the light sources. For example, controller 108 can monitor sensor 116 and determine based on incoming optical signals that a wall or other vertical surface is present in the vicinity of the lighting unit 100. Controller 108 can respond to the presence of the wall or surface by, for example, selecting one or more pre-programmed control signals stored in memory, selecting and executing a new lighting program from memory, otherwise affecting the radiation generated by one or more of the light sources 102, or by moving lighting unit 100 or one or more of light sources 102A, 102B, 102C, and 102D into an orientation that addresses the presence of the wall or surface, as discussed in greater detail below.

As another implementation, the lighting unit 100 may be movably installed in place with a possible range of motion that allows a user to manually manipulate the orientation of lighting unit 100 or one or more of light sources 102A, 102B, 102C, and 102D. In some embodiments, controller 108 can monitor its orientation and respond to movement by, for example, selecting one or more pre-programmed control signals stored in memory, selecting and executing a new lighting program from memory, or otherwise affecting the radiation generated by one or more of the light sources 102.

Figure 2:
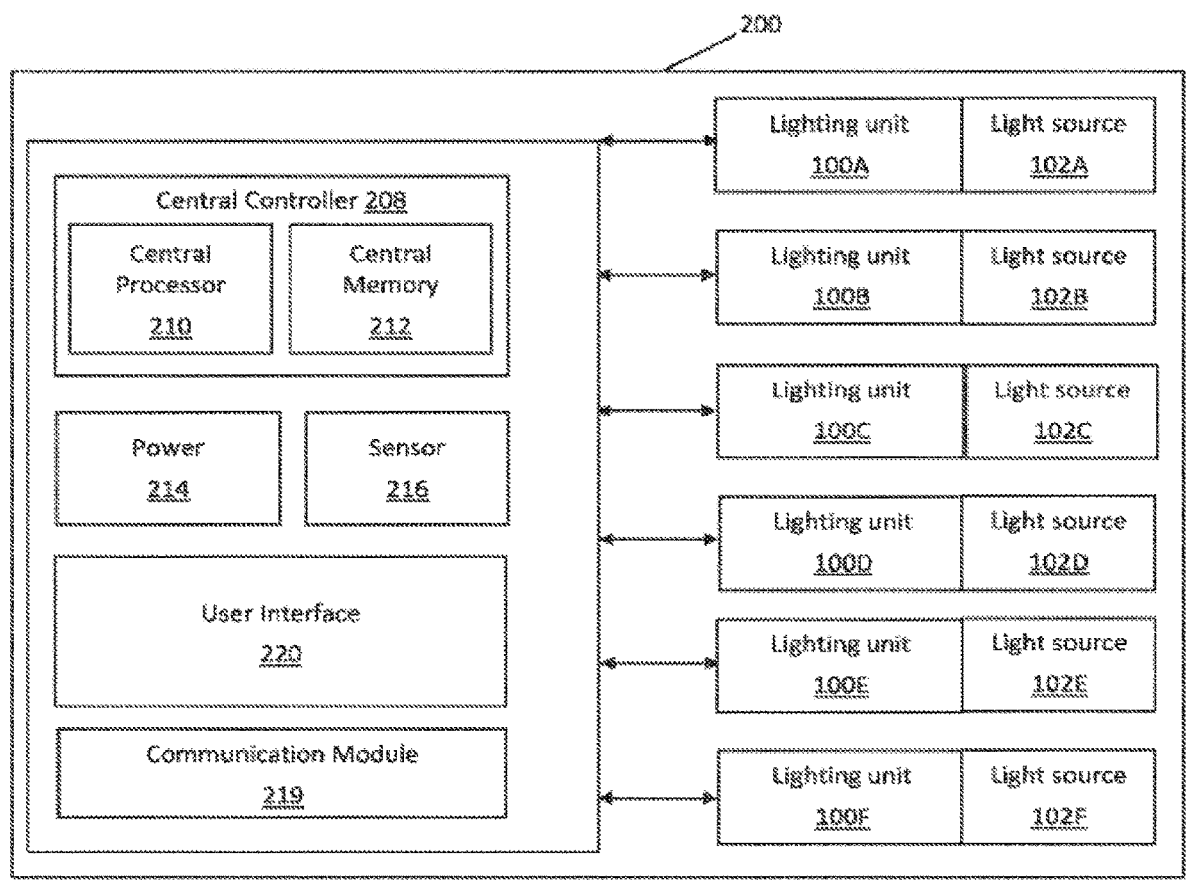
FIG. 2 is a schematic representation of a lighting fixture in accordance with an embodiment of the invention.

FIG. 2 illustrates an example of a lighting fixture 200 in which multiple lighting units 100 are coupled together to form a networked lighting system. According to several embodiments, the lighting fixture 200 is configured a ceiling-mounted lighting panel and/or is integrated into one or more ceiling tiles configured to be installed in a ceiling. Although the lighting fixture in FIG. 2 is depicted with six lighting units, the number and configuration of these lighting units is for illustrative purposes only and thus many other variations are possible.

The lighting fixture 200 may include one or more lighting units 100A, 100B, 100C, 100D, 100E, and 100F (collectively 100). The lighting units can be, for example, identical or similar to the lighting units described in conjunction with FIG. 1, and thus one or more of the light sources may be an LED-based light source that includes one or more LEDs. The lighting fixture 200 can provide functionality separate from and in addition to the functionality provided by one or more of the individual lighting units 100A, 100B, 100C, 100D, 100E, and/or 100F, or the lighting fixture can be a master of all of functionality provided by the lighting units. According to the latter embodiment, the lighting fixture 200 coordinates and controls various aspects of the functionality of lighting units, including but not limited to activation and deactivation, positioning, and intensity, among others. Alternatively, the lighting fixture can be entirely passive, serving only as a housing or enclosure for the lighting unit(s) 100.

In some embodiments of the lighting fixture 200, one or more of the light sources 102 included in the lighting units 100A, 100B, 100C, 100D, 100E, and 100F may include a group multiple LEDs or other types of light sources that are controlled together. Additionally, it should be appreciated that one or more of the light sources may include one or more LEDs that are adapted to generate radiation having any of a variety of wavelengths, including, but not limited to various visible colors, various color temperatures of white light, ultraviolet, or infrared. LEDs having a variety of spectral bandwidths may be employed in various embodiments of the lighting unit.

In some embodiments of the lighting fixture 200, one or more of the lighting units 100A, 100B, 100C, 100D, 100E, and 100F and/or one or more of the light sources 102 included in these lighting units is adjustable. For example, the orientation of the lighting unit, light source, and/or emitted light beam can be adjusted from an orientation more toward the vertical surface to an orientation more toward a horizontal surface, and vice versa. This can be accomplished by manual manipulation of a lighting unit and/or light source, or can be accomplished by a central controller 208. In some embodiments, the orientation of one or more of the emitted light beams can depend upon the positioning of the lighting fixture relative to the vertical surface. For example, a lighting fixture installed closer to a vertical surface will require light beams having angles different from light beams emitted from a lighting fixture installed further away from the vertical surface. This information can be obtained, for example, from the user via a user interface, or from a sensor configured to receive information about the vertical surface, including the angle and position of the vertical surface relative to the lighting fixture 200. In some embodiments, the ratio of the number lighting units emitting a light beam oriented toward the vertical surface to the number of lighting units emitting a light beam oriented toward the horizontal surface is adjustable. For example, the ratio may be adjusted based on the positioning of the lighting fixture relative to the vertical and/or horizontal surface.

In some embodiments, the lighting fixture 200 includes a central controller 208 that is operably connected to one or more of the lighting units and is configured or programmed to output one or more signals to drive these connected light sources and generate varying intensities of light from the light sources. For example, central controller 208 may be programmed or configured to generate a control signal for each light source to independently control the intensity of light generated by each light source, to control groups of light sources, or to control all light sources together. According to another aspect, the central controller 208 may control other dedicated circuitry such as the light source driver 106 for each light source 100 which in turn controls the light sources so as to vary their intensities. In this embodiment, the lighting units may or may not include a separate controller 108.

The central controller 208 can be or employ, for example, a central microprocessor 210 programmed using software to perform various functions discussed herein, and can be utilized in combination with a memory 212. The memory can store data, including one or more lighting commands or software programs for execution by the microprocessor 210, as well as various types of data including but not limited to specific identifiers for that lighting fixture, as well as for the various connected lighting units 100.

In some embodiments, the central controller 208 is coupled to and provides commands to one or more of the individual controllers 108 of lighting units 100A, 100B, 100C, 100D, 100E, and 100F. The central controller 208 is coupled to and provides commands to the individual controllers 108, which in turn are coupled to a light source driver 106 for each lighting unit. The light source driver 106 powers light sources 102 based on commands sent from the central controller 208. In this way, central controller 208 can control a network of lighting units and light sources. For example, central controller 208 can provide control commands to the light source driver 106 of lighting unit 100A to power the light source 102 of lighting unit 100A at 25% light output. The light source driver 106 of lighting unit 100A can then adjust the power provided to the light source 102 of lighting unit 100A in order to achieve 25% light output. Simultaneously or at a different time, central controller 208 can provide control commands to the light source driver 106 of lighting unit 100F to power the light source 102 of lighting unit 100F at 100% light output. The light source driver 106 of lighting unit 100F can then adjust the power provided to the light source 102 of lighting unit 100F in order to achieve 100% light output.

In some embodiments, the central controller 208 operates as the controller for all lighting units 100. Central controller 208 is coupled to a light source driver 106 for each lighting unit, which powers the light sources 102 of that lighting unit based on commands sent from the central controller 208. In this way, central controller 208 can control a network of lighting units and light sources.

The lighting fixture 200 can also include a central source of power 214, most typically AC power, although other power sources are possible including DC power sources, solar-based power sources, or mechanical-based power sources, among others. The power source may be in operable communication with a power source converter that converts power received from an external power source to a form that is usable by the lighting unit.

The lighting fixture 200 can also include one or more sensors 216 adapted to detect a wall or vertical surface within a certain proximity and direction, as discussed below. Accordingly, the sensor 216 can be a variety of different types of sensors, including optical sensors and ambient light sensors. The lighting fixture 200 is coupled to sensor 216 via a local connection and receives sensor values from the sensor 216. In some embodiments the sensor 216 may be mounted on the lighting fixture 200 or integrated with the lighting fixture 200. In some embodiments the connection between the sensor 216 and the lighting fixture 200 is a wired connection. In some embodiments the connection between the sensor 216 and the lighting fixture 200 is a wireless connection. In some embodiments the sensor 216 is positioned so as to provide sensor values that are relevant to the area illuminated by lighting fixture 200.

In some embodiments, the central controller 208 of the lighting fixture 200 may provide lighting control commands based on input or data received from one or more sensors. For example, in some embodiments, the lighting fixture 200 may be coupled to an occupancy sensor, an ambient light level sensor, and/or a timer or clock module.

The lighting fixture 200 can also include one or more user interfaces 220 which allow a user to control a variety of lighting characteristics, including ON/OFF, color, intensity, angle, setting particular identifiers for one or more of the connected lighting units, and many other characteristics. Communication between the user interface and the lighting unit may be accomplished through wired or wireless transmission. Manual control may be effected by the user via switch/control inputs disposed on the lighting unit itself. For example, lighting fixture 200 may be configured to include simple dipswitches, electronic switch buttons, or touch inputs. Dipswitches and electronic switch buttons can provide ON/OFF capabilities, or can also be configured to allow the user to adjust the intensity of the light provided by a single light source, a group of light sources, or all light sources. Alternatively, a user-operated commissioning device with user interaction means (e.g. a smartphone, tablet, or other portable or remote computing device) may be used to commission the lighting unit. For example, NFC (Near-Field Communication) is employed in one embodiment of the invention to establish a communications channel between the lighting unit and the remote computing device.

The lighting fixture 200 may further include an internal or external communication module 219. In some embodiments, communication module 219 communicates with neighboring lighting fixtures to form a network in which the lighting fixtures can operate in tandem. The communication module 219 can be any of a variety of wired or wireless formats, including a wired data bus, wireless RF communication, or light enabled communication such as coded visible or IR light, among other methods. Communication between adjacent lighting fixtures allows for cooperative applications. For example, communication module 219 may allow for the coupling of multiple lighting fixtures together to form a networked lighting system. Further applications are possible in which one or more of the coupled lighting fixtures are addressable. According to this embodiment, the controller 208 may be configured or programmed to respond to data that is specifically addressed to a particular lighting fixture 200 within the network of lighting fixtures.

Figure 3:
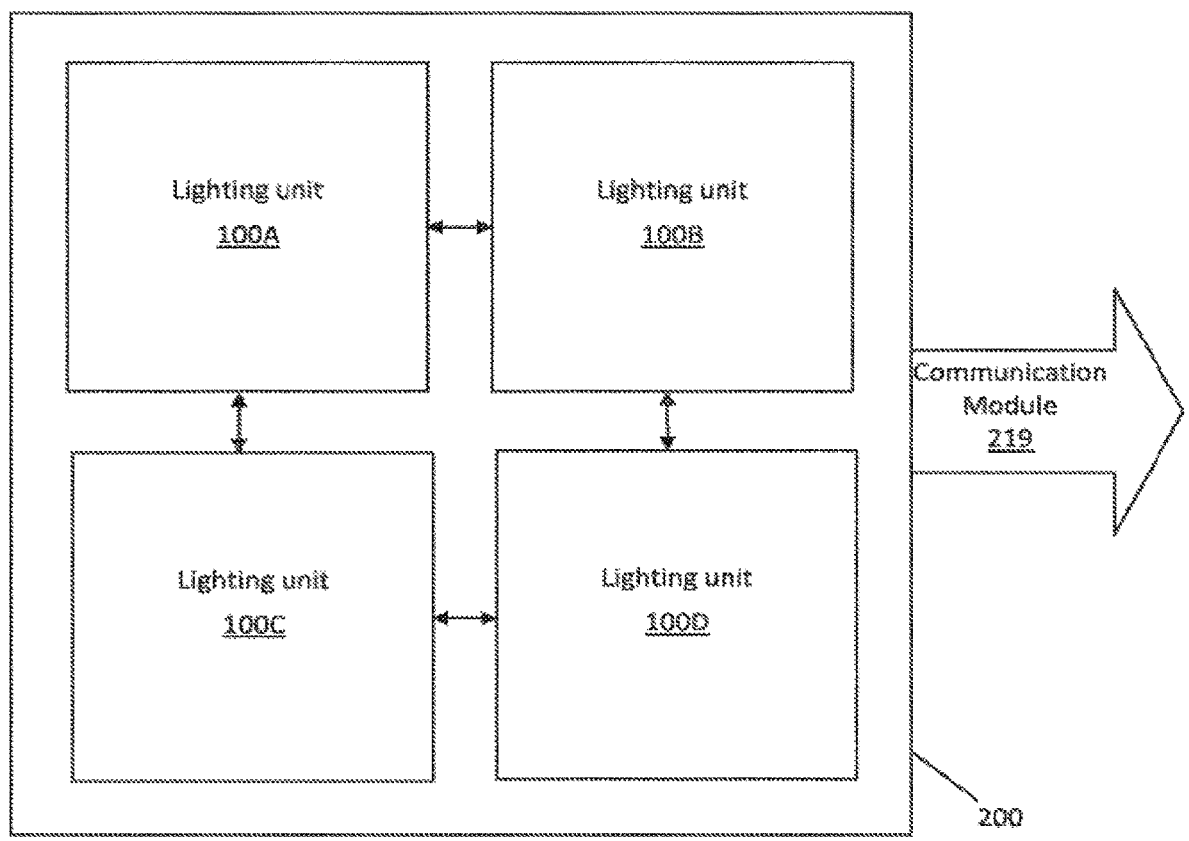
FIG. 3 is a schematic representation of a lighting fixture in accordance with an embodiment of the invention.

FIG. 3 illustrates an example of a lighting fixture 200 with multiple lighting units 100A, 100B, 100C, and 100D. According to several embodiments, the lighting fixture 200 is a ceiling-mounted lighting panel and/or is integrated into a ceiling tile configured to be installed in a ceiling. Although the lighting system in FIG. 3 is depicted with four lighting units, the number and configuration of these lighting fixtures is for illustrative purposes only and thus many other variations are possible. In accordance with embodiments described above, lighting fixture 200 may further include an internal or external communication module 219 that can be configured to communicate with neighboring lighting fixtures to form a network in which the lighting fixtures can operate in tandem. The communication module 219 can be any of a variety of wired or wireless formats, including a wired data bus, wireless RF communication, or light enabled communication such as coded visible or IR light, among other methods.

Figure 4:
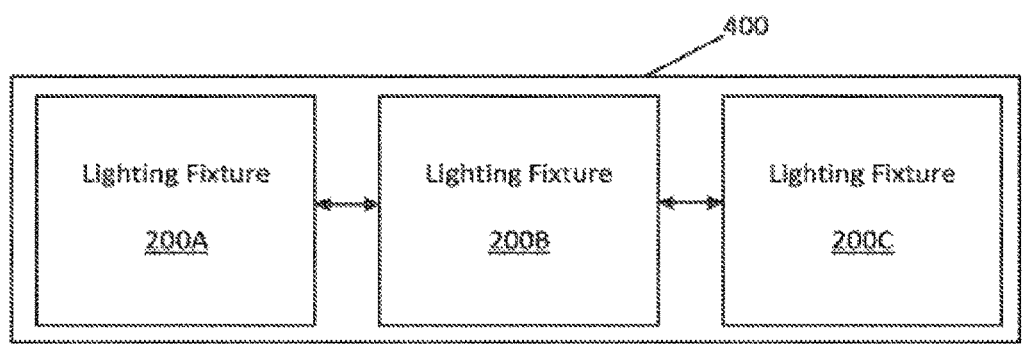
FIG. 4 is a schematic representation of a network of lighting fixtures in accordance with an embodiment of the invention.

FIG. 4 illustrates an example of a lighting system 400 in which multiple lighting fixtures 200A, 200B, and 200C are coupled together to form a networked lighting system. According to several embodiments, each of lighting fixtures 200A, 200B, and 200C are integrated into one or more ceiling tiles installed in a ceiling. For example, the lighting fixtures 200A, 200B, and 200C may be integrated into one or more ceiling tiles installed in the ceiling next to a wall or vertical surface to allow for configurability. Although the lighting system in FIG. 4 is depicted with three lighting fixtures, the number and configuration of these lighting fixtures is for illustrative purposes only and thus many other variations are possible. The lighting system 400 may also include a communications module 410 similar or identical to any of the communications modules disclosed herein. The lighting system 400 may also include a user interface 420 similar or identical to any of the user interfaces disclosed herein.

The embodiments of lighting fixtures 200 in FIGS. 3 and 4 may include one or more lighting units 100 which can be, for example, identical or similar to the lighting units described in conjunction with FIG. 1, and thus one or more of these light sources may be an LED-based light source that includes one or more LEDs.

Figure 5:
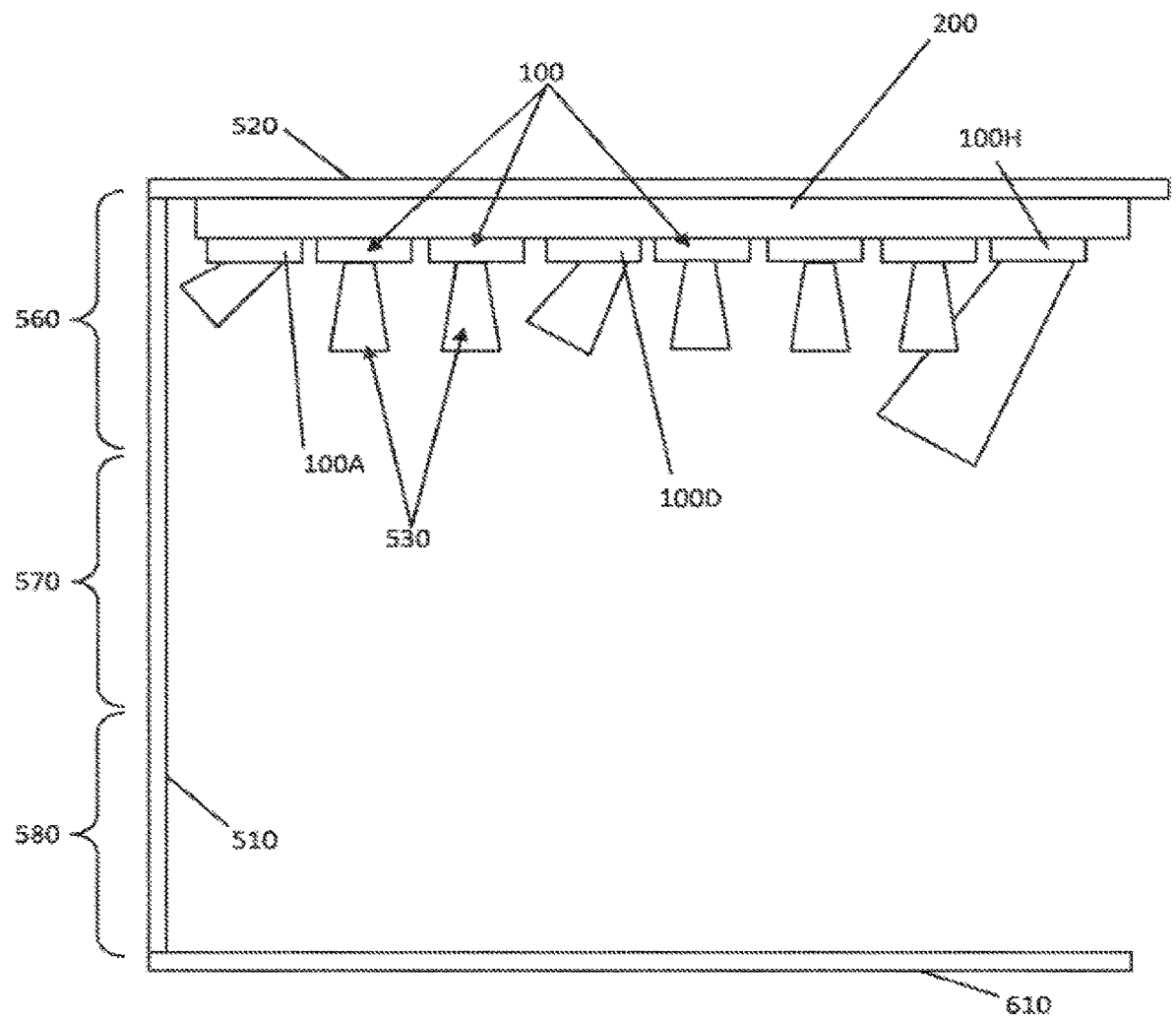
FIG. 5 is a schematic representation of a network of lighting units in accordance with an embodiment of the invention.

FIG. 5 illustrates a lighting fixture 200 in which there is a relationship between the location of light sources in the system, the intensity of light emitted by these light sources, and the direction of the light distribution. In some embodiments, in order to achieve both wall-washing and downlighting effects, the orientation and intensity of light sources within the lighting fixture 200 are variable. For example, to achieve approximately consistent wall-washing effects on wall 510, both the orientation and intensity of light sources within lighting fixture 200 are controlled and can be modified. It should be noted that wall 510 can be any internal or external wall or vertical surface 510 for which wall-washing effects are desired. A horizontal surface 610 can be any floor, bottom surface, shelf, or other substantially horizontal surface.

In some embodiments, the lighting fixture 200 is installed or connected to ceiling or upper surface 520. The lighting fixture 200 can include one or more lighting units 100, which can be coupled together to form a networked lighting system. According to several embodiments, the lighting units 100 can be, for example, identical or similar to the lighting units described in conjunction with FIG. 2 or 3, and thus one or more of the lighting units may include one or more LED-based light sources 102 that include one or more LEDs.

In some embodiments of the lighting fixture 200, in order to create uniform wall-washing effects on wall 510, both the orientation and intensity of light sources within the lighting fixture 200 are controlled and can be modified. For example, the upper portion 560 of wall 510 is illuminated by light (indicated by numeral 530) emitted from lighting units 100 that are in close proximity to wall 510, such as lighting unit 100A, while the lower portion 580 of wall 510 is illuminated by light emitted from lighting units that are not in close proximity to wall 510, such as lighting unit 100H. The middle or intermediate portion 570 of wall 510 is illuminated by light emitted from lighting units that are located centrally, such as lighting unit 100D. Alternatively, the lighting units 100A, 100D, and 100H can be located next to each other but simply oriented toward different portions of the vertical surface. In some embodiments, the angle of light emitted by one or more of lighting unit 100 in the lighting fixture 200 can be adjusted. For example, the lighting units can be movable, or the lighting fixture can include movable light sources 102, among other ways of adjusting the angle of emitted light in the lighting fixture 200. The angle of emitted light can be adjusted manually or automatically based on user input or sensor data as described above.

In some embodiments of the lighting fixture 200, the low-intensity light beam emitted by lighting units close to the wall are emitted at a first angle, the high-intensity light beam emitted by the lighting units remote from the wall are emitted at a third angle, and the intermediate-intensity light beam emitted by the lighting units located between the close and far lighting units are emitted at a second angle. To provide the desired wall-washing effects, the first angle is less than the second angle, and the second angle is less than the third angle (as shown in FIG. 5). The first angle is a function of the distance between the proximate lighting units and the wall, the second angle is a function of the distance from the wall to the intermediate lighting units, and the third angle is a function of the distance from the wall to the third lighting unit (as shown in FIG. 5).

The intensity or orientation of one or more light beams emitted from one or more of the lighting units 100 within the lighting fixture 200 is adjustable, either individually or as a single network, as described in greater detail above. In some embodiments, the light emitted from lighting unit 100A located within close proximity to wall 510 is of low intensity, since the light sources 102 within this lighting unit are located closer to wall 510. The light emitted from lighting unit 100H located further from wall 510 is of higher intensity, since the light sources 102 within this lighting unit are located farther from wall 510. The light emitted from lighting unit 100D can be between the intensity of light emitted by lighting units 100A and 100H, since the light sources 102 within lighting unit 100D is central to the light emitted by lighting units 100A and 100H. In some embodiments, the other lighting units 100 in lighting fixture 200 are directed substantially downward to create downlighting effects.

In some embodiments, the one or more lighting units 100 in lighting fixture 200, and/or the one or more light sources 102 within each lighting unit can be controlled together or individually to create the desired wall-washing or downlighting effects, as described in greater detail above. For example, this control can be performed manually or automatically. As described herein, manual control may be effected by the user via switch/control inputs disposed within lighting fixture 200. For example, the rear surface of a ceiling tile may be configured to include simple dipswitches, electronic switch buttons, or touch inputs. Dipswitches and electronic switch buttons can provide ON/OFF capabilities. However, the electronic switch buttons and touch inputs can also be configured to allow the user to adjust the intensity of the light provided by a specific lighting fixture 200, lighting unit 100 and/or light source 102. In addition, markings may be provided on the tile to indicate which sides of the ceiling tiles are equipped with wall-washing capabilities. Alternatively, a user-operated commissioning device with user interaction means (e.g. a smartphone, tablet, or other portable computing device) may be used to commission the tiles and to activate the selected wall-washing sides of the various tiles. For example, NFC (Near-Field Communication) is employed in one embodiment of the invention to establish a communications channel between a smartphone and a particular addressable ceiling tile, lighting fixture 200, lighting unit 100 and/or light source 102.

Figure 6:
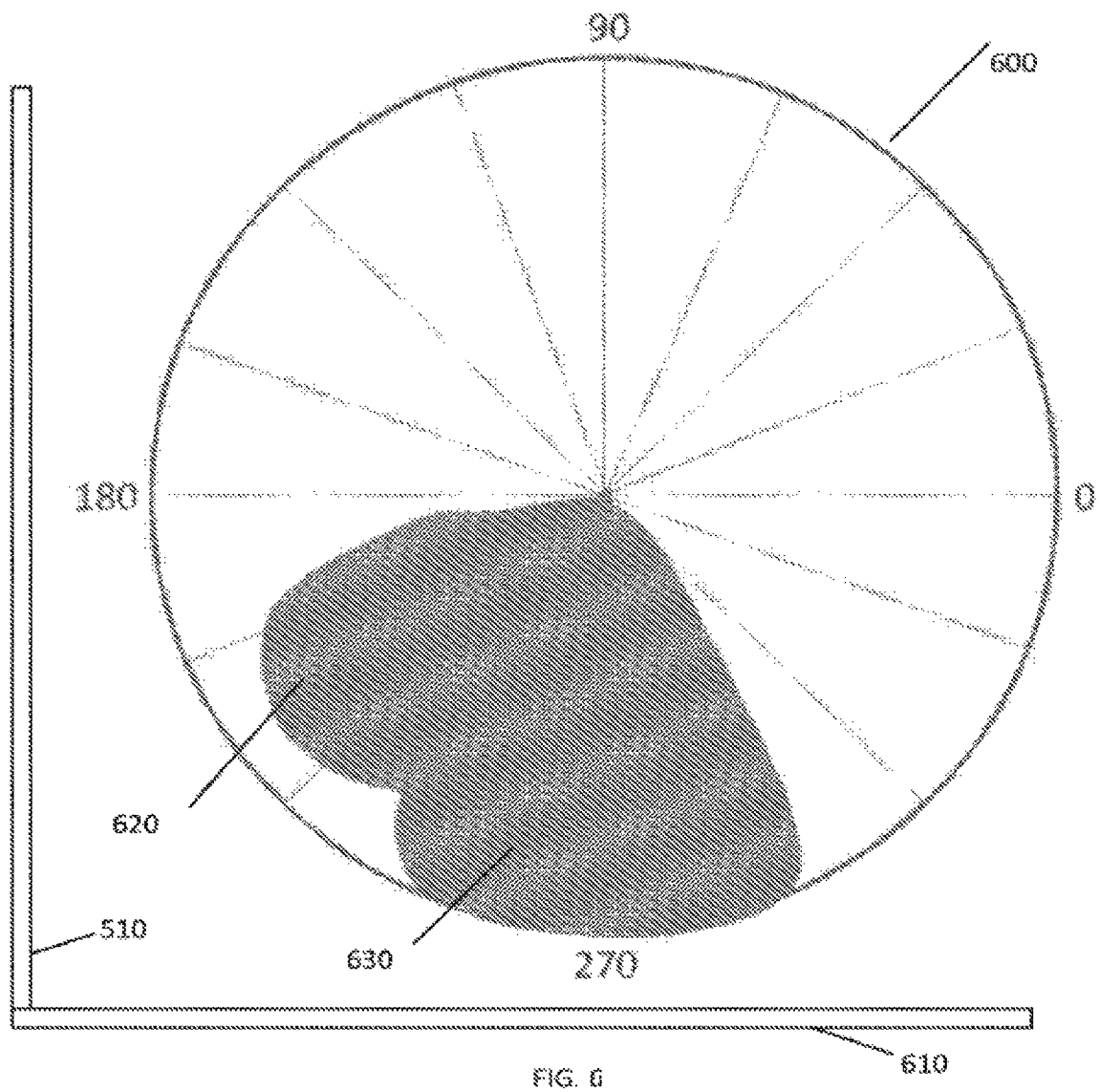
FIG. 6 is a schematic representation of a plot of radiation intensity and distribution from a lighting fixture in accordance with an embodiment of the invention.

FIG. 6 illustrates the relationship between location and the radiation intensity and distribution from a lighting fixture 200 in accordance with an embodiment. The circular plot 600 represents the possible lighting effects of an installed lighting fixture 200, with wall 510 and floor 610. In some embodiments, at least some of the multiple light sources in lighting fixture 200 are aimed downwards toward floor 610 at approximately 270° to create downlighting effects, represented by lobe 630 in FIG. 6. At least some of the remaining light sources in lighting fixture 200 are aimed toward wall 510 at between approximately 180° and 270° to create wall-washing effects, represented by lobe 620 in FIG. 6.

In some embodiments, the intensity of light emitted from a lighting fixture 200 is variable to create desired wall-washing effects as described in greater detail herein. The circular plot 600 in FIG. 6 also represents the intensity of light emitted from lighting fixture 200. For example, the light sources in lighting fixture 200 aimed downwards toward floor 610 at approximately 270° are directed or controlled to emit high intensity light in order to create bright downlighting effects, as represented by lobe 630 in FIG. 6. For example, the light sources in lighting fixture 200 aimed toward wall 510 at between approximately 180° and 270° are directed or controlled to emit lower intensity light in order to create softer wall-washing effects, as represented by lobe 630 in FIG. 6.

In some embodiments, if lighting fixture 200 in FIG. 6 was placed in a corner of a room, for example, some of the light sources in lighting fixture 200 could be aimed towards the second wall (not shown) bordering wall 510, which would produce a third lobe of emitted light (not shown) at between approximately 0° and 270° to create wall-washing effects on the second wall as well.

Figure 7:
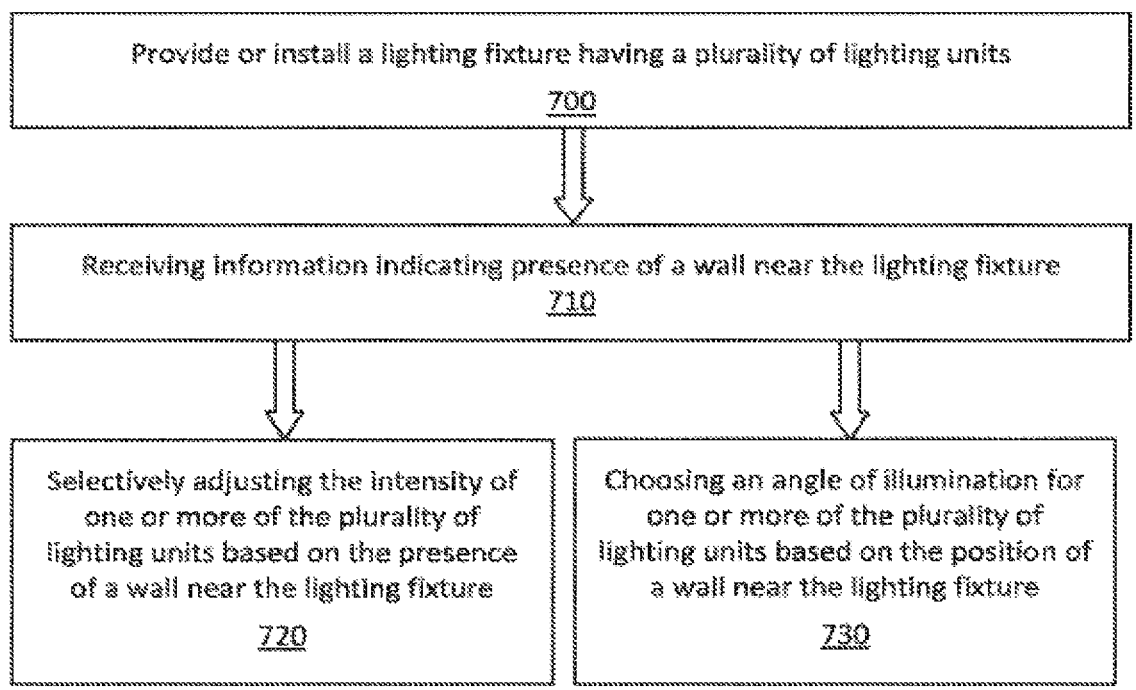
FIG. 7 is a flow chart of a method for selectively illuminating a vertical surface using a lighting fixture in accordance with an embodiment of the invention.

FIG. 7 illustrates a flow chart of an example method of producing desired wall-washing effects based on user input and/or sensor data in accordance with an embodiment. Other implementations may perform the steps in a different order, omit certain steps, and/or perform different and/or additional steps than those illustrated in FIG. 7. For convenience, aspects of FIG. 7 will be described with reference to one or more components of a lighting system that may perform the method. The components may include, for example, one or more of the components of lighting units 100 of FIG. 1, lighting fixtures 200 of FIGS. 2 and 3, and/or lighting fixtures and system of FIGS. 4 and 5. The lighting units 100 may include, for example, light sources 102, a controller 108, and/or similar components of lighting unit 100. Accordingly, for convenience, aspects of FIGS. 1-5 will be described in conjunction with FIG. 7.

In step 700, a lighting fixture 200 is provided that includes one or more lighting units 100, which in turn include one or more light sources 102. The lighting fixture 200 can be any of the embodiments described herein or otherwise envisioned. According to several embodiments, lighting fixture 200 is integrated into a ceiling tile installed in a ceiling. For example, the lighting fixture 200 may be integrated into a ceiling tile installed in the ceiling next to a wall to allow for configurability. The embodiments of lighting fixture 200 in FIG. 7 may include one or more lighting units 100 which can be, for example, identical or similar to the lighting units described in conjunction with FIG. 1, and thus one or more of the light sources 102 of the one or more lighting units 100 may be an LED-based light source that includes one or more LEDs.

In step 710, the lighting fixture 200 receives information indicating the presence and/or positioning of a wall in the proximity of the lighting fixture. In some embodiments, a sensor determines an ambient light level in the location of the installed lighting fixture 200 in order to inform the lighting system of the presence or absence of a wall. For example, the lighting fixture 200 can include one or more sensors to detect a wall within a certain proximity and direction. Accordingly, the sensor can be a variety of different types of sensors, including optical sensors and ambient light sensors. Lighting fixture 200 is preferably coupled to the sensor via a local connection and receives sensor values from the sensor. In some embodiments the sensor may be mounted on the lighting fixture 200 or integrated with the lighting fixture 200. In some embodiments the connection between the sensor and the lighting fixture 200 is a wired connection. In some embodiments the connection between the sensor and the lighting fixture 200 is a wireless connection. In some embodiments the sensor is positioned so as to provide sensor values that are relevant to the area illuminated by lighting fixture 200.

In some embodiments the lighting fixture 200 is configured to detect the presence of a wall at various sides or angles using, for example, distance sensors (e.g., ultrasound based sensor) that detect the presence of, and optionally the distance to, a wall. From the detected values the central controller 208 of lighting fixture 200 determines which side or sides of the lighting fixture the wall is situated. A second set of measurements can be performed to detect the height of the wall which is then used to determine the activation and required brightness of the corresponding light sources 102. The central controller 208 of lighting fixture 200 then creates a default beam pattern. This default pattern can be adjusted manually or automatically. In some embodiments, differences in wall reflectance can facilitate the determination of the resulting wall luminance when illuminated by a light source. For example, these differences could require tuning the intensity and/or angle of radiation emitted by the light source in the direction of the wall. Options to control the intensity of the and/or angle of radiation emitted by the light source include tuning by the user, controlling the light output distribution produced by the light source; and/or using a wireless sensor that sends out measured light reflected off the wall to the central controller 208 regulating the lighting fixture 200 to achieve a target set-point value. In some embodiments, the sensor is positioned to measure light reflected off the wall at the level of an individual's eye when sitting down.

In some embodiments the installed lighting fixture 200 includes one or more user interfaces which allow a user to control a variety of lighting characteristics, including ON/OFF, color, intensity, angle, setting particular identifiers for the lighting unit, and many other characteristics, and allow the user to inform the lighting fixture 200 of the existence or absence of a wall. Communication between the user interface and the lighting unit may be accomplished through wired or wireless transmission. Manual control may be effected by the user via switch/control inputs disposed on the lighting unit itself. Alternatively, a user-operated commissioning device with user interaction means (e.g. a smartphone, tablet, or other portable or remote computing device) may be used to commission the lighting unit.

In step 720, the intensity of the one or more of the plurality of lighting units 100 in lighting fixture 200 is adjusted based on the received information about the presence of a wall near the lighting fixture. For example, the intensity of light emitted from one or more of the lighting units 100 within lighting fixture 200 is adjustable, either individually or as a single network, as described in greater detail above. In some embodiments, the light emitted from one or more lighting units located within close proximity to the wall is adjusted to be of low intensity, since the light sources 102 within these lighting units are located closer to the wall. The light emitted from the one or more of the lighting units located further from the wall is of higher intensity, since the light sources 102 within these lighting units are located farther from the wall. In some embodiments, the lighting fixture 200, the one or more lighting units 100 in lighting fixture 200, and/or the one or more light sources 102 within the one or more lighting units can be controlled together or individually to create the desired wall-washing or downlighting effects, as described in greater detail above.

In step 730, an angle of illumination of one or more of the plurality of lighting units is adjusted based on the presence or position of a wall near the lighting fixture. In some embodiments of lighting fixture 200, in order to create uniform wall-washing effects on the nearby wall the orientation of light sources within lighting fixture 200 are controlled and can be modified. For example, the upper portion of the nearby wall is illuminated by light emitted from lighting units 100 that are in close proximity to the wall, while the lower portion of the wall is illuminated by light emitted from lighting units that are not in close proximity to the wall. The middle portion of the wall is illuminated by light emitted from lighting units that are located centrally. Accordingly, in some embodiments, the angle of light emitted by one or more of lighting units in lighting fixture 200 can be adjusted. For example, the lighting fixture itself can be movable, the lighting fixture can include movable lighting units 100, or the lighting fixture can include movable light sources 102, among other ways of adjusting the angle of emitted light in lighting fixture 200. The angle of emitted light can be adjusted manually or automatically based on user input or sensor data as described above.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Reference numerals appearing between parentheses in the claims, if any, are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A lighting fixture located in close proximity to a vertical surface, the lighting fixture comprising:
    a plurality of lighting units, comprising:
        at least one first lighting unit comprising a first plurality of LED-based light sources configured to emit a first light beam oriented toward a first portion of the vertical surface;
        at least one second lighting unit comprising a second plurality of LED-based light sources configured to emit a second light beam oriented toward a second portion of the vertical surface;
        at least one third lighting unit comprising a third plurality of LED-based light sources configured to emit a third light beam oriented toward a horizontal surface; and
    a controller operably connected to plurality of lighting units, wherein said controller is configured to control said first, second, and third plurality of light sources such that said first light beam has an intensity that is lower than an intensity of the second light beam, wherein the second portion of the vertical surface is lower than said first portion of the vertical surface.

2. The lighting fixture of claim 1, wherein said lighting fixture is a lighting panel configured to be mounted on a ceiling or to be integrated within a ceiling tile.

3. The lighting fixture of claim 1, further comprising at least one fourth lighting unit comprising a fourth plurality of light sources configured to emit a fourth light beam oriented toward a third portion of the vertical surface, wherein the third portion is an intermediate portion of the vertical surface that is disposed between the first portion and the second portion, and wherein the fourth light beam has an intensity that is between the intensity of the first beam and the intensity of the second beam.

4. The lighting fixture of claim 1, wherein the orientation of each of the light beams is adjustable.

5. The lighting fixture of claim 1, further comprising a sensor configured to obtain data about said vertical surface, wherein said controller is further configured to control the intensity or orientation of light emitted from one or more of said first, second, and third plurality of light sources based at least in part on said obtained data.

6. The lighting fixture of claim 1, wherein the number of third lighting units configured to emit a light beam oriented toward the horizontal surface, and the number of first and second lighting units configured to emit a light beam oriented toward the vertical surface within the plurality of lighting units, is adjustable based on positioning of the lighting fixture relative to the vertical surface.

7. The lighting fixture of claim 1, wherein a ratio of the number of third lighting units configured to emit a light beam oriented toward the horizontal surface and the number of first and second lighting units configured to emit a light beam oriented toward the vertical surface is adjustable based on positioning of the lighting fixture relative to the vertical surface.

8. The lighting fixture of claim 7, further comprising a sensor configured to obtain data about said vertical surface, wherein said controller is configured to control said ratio based at least in part on said obtained data.

9. The lighting fixture of claim 1, wherein the lighting fixture is closer to the first portion of the vertical surface than said second portion of the vertical surface.

10. A ceiling-mounted lighting fixture comprising:
    a plurality of lighting units each comprising a plurality of LED-based light sources, wherein a first subset of said plurality of lighting units are configured to emit a light beam oriented toward a vertical surface, and wherein a second subset of said plurality of lighting units are configured to emit a light beam oriented toward a horizontal surface, and further wherein at least some of said plurality of lighting units are configured to be adjustable to emit a light beam oriented toward either said vertical surface or said horizontal surface; and a controller operably connected to said plurality of lighting units and configured to control the intensity of light emitted from said LED-based light sources, and further configured to control the orientation of the light beam emitted by each of said adjustable lighting units and to orient light emitted by a number of said at least some of said plurality of lighting units toward the horizontal surface and away from the vertical surface based at least in part on a determination of a position of the lighting fixture relative to the vertical surface.

11. The ceiling-mounted lighting fixture of claim 10, wherein the orientation of the light beam emitted by each of said adjustable lighting units is based at least in part on positioning of the lighting fixture relative to the vertical surface.

12. The ceiling-mounted lighting fixture of claim 10, further comprising a sensor configured to obtain data about said vertical surface, wherein the orientation of the light beam emitted by each of said adjustable lighting units is adjusted based at least in part on said obtained data.

13. The ceiling-mounted lighting fixture of claim 10, wherein the orientation of the light beam emitted by each of said adjustable lighting units is adjusted based at least in part on input received from a user.

14. A method for providing wall-washing lighting effects, the method comprising the steps of:

providing a lighting fixture comprising: (i) a plurality of lighting units each comprising a plurality of LED-based light sources, wherein a first subset of said plurality of lighting units are configured to emit a light beam oriented toward a vertical surface, and wherein a second subset of said plurality of lighting units are configured to emit a light beam oriented toward a horizontal surface, and further wherein at least some of said plurality of lighting units are configured to be adjustable to emit a light beam oriented toward either said vertical surface or said horizontal surface; and (ii) a controller operably connected to said plurality of lighting units and configured to control, based at least in part on determination of a position of the lighting fixture relative to the vertical surface, which of said at least some of said plurality of lighting units emit light oriented toward said horizontal surface and away from the vertical surface;

receiving information indicating the position of the lighting fixture relative to the vertical surface; and adjusting the orientation or intensity of the light beam emitted by one or more of said adjustable lighting units based on said received information.

15. The method of claim 14, wherein said information is received from a user.

16. The method of claim 14, wherein said information is received from an ambient light level sensor configured to obtain ambient light level data.

* * * * *